United States Patent
Finlayson et al.

(10) Patent No.: US 6,912,305 B1
(45) Date of Patent: Jun. 28, 2005

(54) COMPUTER ANIMATION

(75) Inventors: Scott Robert Finlayson, North Sydney (AU); Michael Low, North Sydney (AU)

(73) Assignee: Access Systems Ltd, Sydney (AU)

( * ) Notice: Subject to any disclaimer, the term of this patent is extended or adjusted under 35 U.S.C. 154(b) by 0 days.

(21) Appl. No.: 09/392,758

(22) Filed: Sep. 7, 1999

(30) Foreign Application Priority Data

Sep. 8, 1998 (AU) .............................................. PP 5786

(51) Int. Cl.[7] .............................. G06K 9/00; G06K 9/36
(52) U.S. Cl. ........................ 382/162; 382/166; 382/245
(58) Field of Search ................................ 382/218, 219, 382/162, 166, 232, 233, 236, 245, 253, 246; 345/473, 474, 589, 601, 619

(56) References Cited

U.S. PATENT DOCUMENTS

| | | | | |
|---|---|---|---|---|
| 4,878,178 A | * | 10/1989 | Takakura et al. | 358/133 |
| 4,914,508 A | * | 4/1990 | Music et al. | 358/133 |
| 5,515,077 A | * | 5/1996 | Tateyama | 345/153 |
| 5,600,773 A | * | 2/1997 | Vanover et al. | 345/199 |
| 5,951,624 A | * | 9/1999 | Gray et al. | 382/233 |
| 5,987,190 A | * | 11/1999 | Takahashi et al. | 382/293 |
| 6,037,982 A | * | 3/2000 | Coelho | 348/393 |

FOREIGN PATENT DOCUMENTS

| | | | | |
|---|---|---|---|---|
| AU | | 555108 | 9/1986 | B65G/11/20 |

\* cited by examiner

*Primary Examiner*—Andrew W. Johns
*Assistant Examiner*—Amir Alavi
(74) *Attorney, Agent, or Firm*—Molins & Co.

(57) ABSTRACT

A method of creating a binary animation file commences with the step of selecting an initial image and subsequent images having pixels. The color pallet of the initial image (having n indexes) in converted to a colour pallet having n−1 indexes so that one of the n indexes is used as a mask index. Second and subsequent images are determined and are used to define a frameset which begins with the initial image and defines a sequence of images. The initial image is compressed using Run Length Encoding and stored to a movie file. Using the mask index, a new data array is created for the second and subsequent images. The second image is compared to the initial image on a pixel by pixel basis. The method requires the storing of differences between the first and second images in the form of difference data to the movie file, the difference data comprising an array of bytes that represents a Run Length Encoded compressed description.

8 Claims, 3 Drawing Sheets

COMPUTER ANIMATION

FIELD OF THE INVENTION

The invention pertains to methods of displaying, managing, compressing, storing and transmitting computer displayed animations and more particularly to such a method ideal for use with Java.

BACKGROUND OF THE INVENTION

When building animations in Java applets, the traditional approach is to load a number of GIF files into memory and then to draw them to the screen one after another. GIF files are used in Internet applications because they give excellent compression (up to about 10 times) for 256 and 16 colour graphics. Because of the compression routine used, decompression requires time. In order to ensure that a GIF can be drawn to screen instantly as required by the animation sequence, GIFs are prepared for rendering by decompressing them to a standard Java Image object. The problem is exacerbated because Java Images are stored as 32 bit RGB+ alpha channel images. This means that a single frame of an animation can expand up to 40 times the size of the original GIF file. On typical personal computers this memory glut causes the system to start to page memory to the disk drive which in turn causes poor animation performance.

Throughout this document, the term "movie" is used to denote a computer animation.

OBJECTS AND SUMMARY OF THE INVENTION

It is an object of the invention to provide a method for managing data used in creating animations.

It is another object of the invention to provide a method for displaying animations. It is yet another object of the invention to provide a method for transmitting animations.

In summary, a file is created having an array of data which specifies an initial image. The file also stores the difference between the initial image and a subsequent image. The initial image is loaded into memory as an array. The initial image is displayed. The subsequent image is displayed by mapping the difference onto the array and producing the subsequent image.

Accordingly, there is provided a method of creating a binary animation file. The method comprises the steps of selecting an initial image (having n indexes) in converted to a colour pallet having n−1 indexes so that one of the n indexes is used as a mask index. Second and subsequent images are determined and are used to define a frameset which begins with the initial image and defines a sequence of images. The initial image is compressed using Run Length Encoding and stored to a movie file. Using the mask index, a new data array is created for the second and subsequent images. The second image is compared to the initial image on a pixel by pixel basis. The method requires the storing of differences between the first and second images in the form of difference date to, the movie file, the difference data comprising an array of bytes that represents a Run Length Encoded compressed description.

In another embodiment, the second or subsequent images in the frameset are analysed to determine a bounding box in which pixels have changed from the previous image. This change is the bounding box data. The bounding box is defined as having a location and the location of the bounding box is stored to the movie file. The bounding box data is encoded using Run Length Encoding then stored to the movie tile.

The invention also comprises a method of displaying, on a computer having a screen, an animation stored to a file of the type referred to above. The display method utilises image display software on a computer to interpret the movie file. The Run Length Encoded data from the movie file is loaded into the memory of the computer. The method requires the decoding of the first frame to a non-compressed array, then using the array to produce an initial image on the screen. The method also involved decompressing and mapping the Run Length Encoded data for the second and subsequent frames, in real time, onto the non-compresses array and producing a second and subsequent images on the screen.

BRIEF DESCRIPTION OF THE DRAWING FIGURES

BEST MODE AND OTHER EMBODIMENTS OF THE INVENTION

Figure 1:
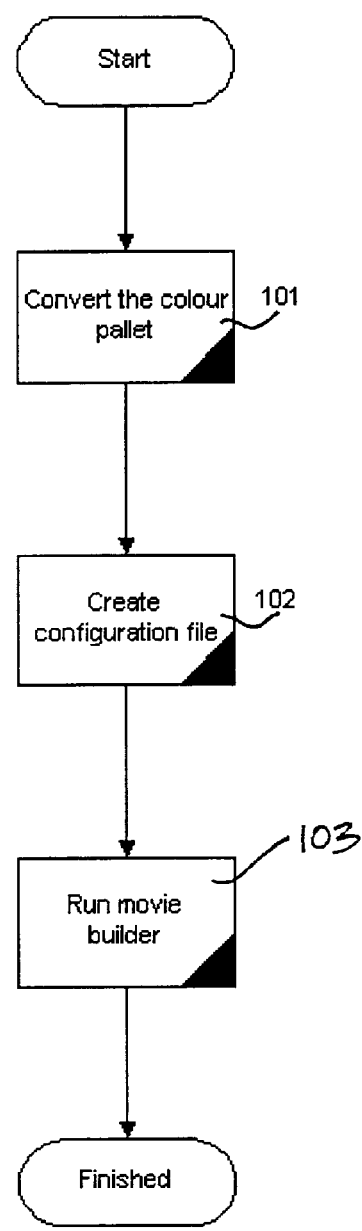
FIG. 1 is a flow chart illustrating the steps of creating a movie file.
Figure 2:
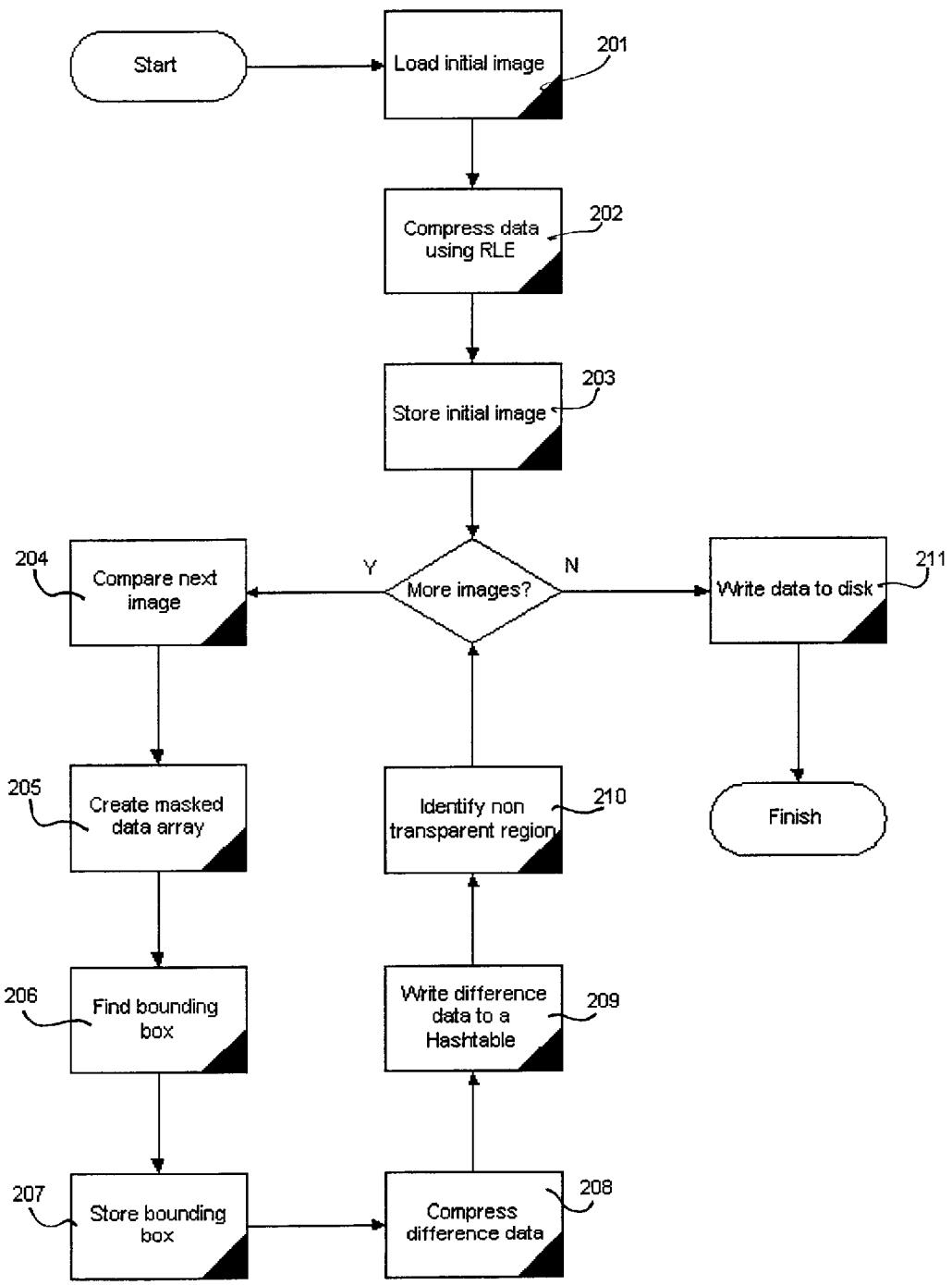
FIG. 2 is a flow chart illustrating the steps of building a movie.
Figure 3:
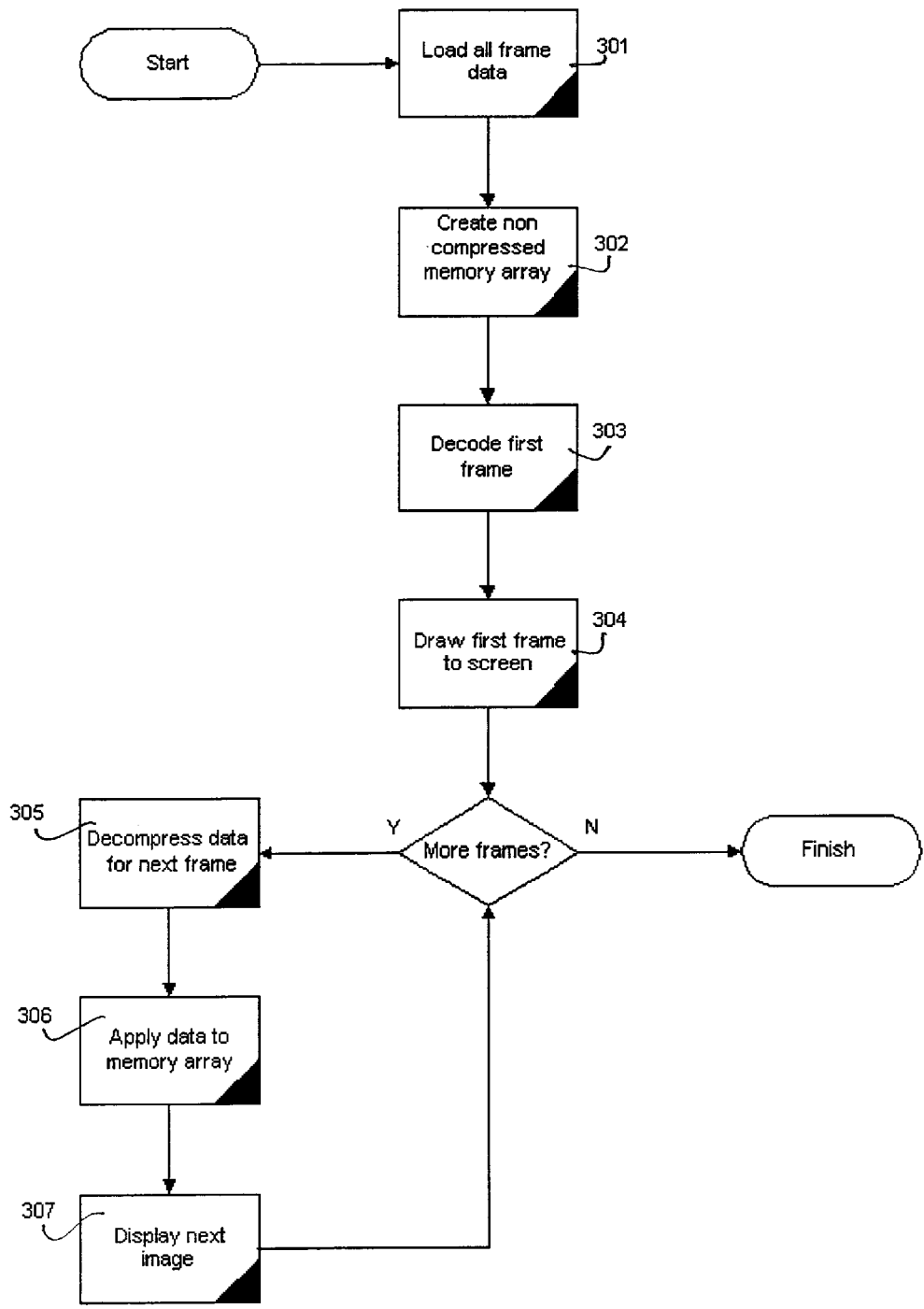
FIG. 3 is a flow chart illustrating the steps of playing a movie.

To implement the objects of the invention (and as illustrated in FIGS. 1–3), one requires a method of storing the differences between adjacent frames of animation. This is done by first examining the (e.g.) 16 or 256 colour indexes which are associated with an initial image. One of these indexes is selected and designated as "off limits" to the image and referred to as the mask index. This is a form of conversion of the colour pallet and is shown as 101 in FIG. 1. Wherever this index appears in the aforementioned difference data, the corresponding pixel of the next frame is left unchanged. The effect is a loss of one colour from the colour pallet but a gain in compression as the difference data will generally contain large sequences of the mask index.

This gain in compression is realized because a Run Length Encoding (RLE) algorithm 208 is used to store 209 and retrieve 305 the difference data. The RLE method stores a count of how many times a pixel will be repeated rather than storing multiple pixels of the same value.

A second level of compression may be realized by determining a bounding box 206 for all the pixels that have changed before the RLE algorithm is applied. By storing the bounds of the changed area, less pixels need to be stored in the difference data.

As shown in FIG. 1, a single binary movie file is created and used to fully describe one or more animations. That file specifies which frame sequences will be displayed on the users screen. A single sequence is referred to as the frameset. The file can actually contain any number of the framesets. The file also stores the differences between adjacent frames into a harsh table 209. The hash table key is built form a source frame number and a destination frame number. Thus, the same difference data can be used when the same sequence is used more than once. For example in the frame sequence defined as "1,2,3,4,3,4"the difference data between the frame numbers 3 and 4 is reused when moving from the $5^{th}$ to the $6^{th}$ frame.

The first frame of each frame set is stored in its entirety 202. Thus, for two framesets "1,2,3,4,5" and "3,2,1", no difference data is stored for the frame 2 to frame 3 in the first frameset as frame three is already stored in its entirety as the initial frame of the second of the framesets. When a frame is used repeatedly, it may be stored in its entirety where the whole frame image data is smaller than the sum of the difference data required by the frameset. For example in the frameset "1,2,3,2,4,2,5,2 . . ." it may be more economical to store frame 2 in its entirety rather than the 1,2 and 3,2 and 4,2 and 5,2 (etc) differences.

If an application requires that different frames of a movie use different color tables, then the design allows for multiple colour tables to be store for each frame. This data can be stored in the same way as the pixel data, with a base colour table stored, and a difference file stored for subsequent changes to the colour table.

The animation or movie file is written in a format which is recognised by the software which decodes it for display 211. It has been found that this technique results in a smaller memory footprint on the user's computer. In addition, the movie file often takes up less space, in transmission or on disk, than the equivalent GIF files would have.

One example of such a format is given below:

| TYPE | VALUE | DESCRIPTION |
|---|---|---|
| Short | Version | Version of the movie file format |
| Short | Width | Width in pixels of the movie |
| Short | Height | Height in pixels of the movie |
| Byte | MaskIndex | The index used for the mask index |
| Short | Transparency | The index of the transparency colour, −1 if no transparency |
| | Colour Table | |
| Byte array | Reds | An array of bytes for the red component of each index in the colour table |
| Byte array | Greens | An array of bytes for the green component of each index in the colour table |
| Byte array | Blues | An array of bytes for the blue component of each index, in the colour table |
| Hashtable | FrameSets | A hashtable of framesets. Each object in the frameset contains a vector or integers representing the sequence of frames. Each value in the vector is the index into the Movie Frame Array described below |
| Int | FrameCourt | The number of frames in the movie frame array |
| | MovieFrame Array | |
| Rectangle | Bounds | The bounding box of the area of the image to be changed |
| Rectangle | DrawBounds | The bounding box of the non transparent area of the frame |
| Byte array | Data | Array of bytes that represent the frame, is compressed format |

In the following example, the methods are explained with reference to the authoring of two frames 11 and 12 of a frameset depicting a person winking. It is the initial image and is a 256 colour GIF image of a person with both eyes open. Frame 12 is the second image in the animation and is identical to 11 except that the person's right eye is closed. The frameset consists of the image indexes 11, 12, 11, 12.

The first step 101 is the conversion of the 256 colour pallet to a 255 colour pallet so that one of the colour indexes to the pallet can be used as the mask index. This may be done by an image manipulation product. Next, the author sets up a configuration file 102. The configuration file contains the identity of the mask index, a list of all of the images (11, 12), and the frame set or sets that will be compressed. Each frameset is named for later use. The frameset (11, 12, 11, 12) might be called "Winking".

The author or animator then runs a "movie building" program 103 (for details of 103, see FIG. 3), for example a Java program, into which is input the name of the configuration file. This movie building program gets the initial image 201 (11) and compresses it using the RLE algorithm 202. This is stored to the movie file 203. This is done for each initial image if there is more than one frameset. Next the program compares 204 the second image (12) to the initial image on a pixel basis and creates new data array for the second image 205. Where the second image is the same as the initial image (everywhere, but the right eye) the mask index is used. Next, the movie building program analyses the second image data and optionally determines the rectangular boundaries of the area in which pixels have changed 206. This is referred to as a bounding box and is described by the locations of (for example) the upper left and lower right pixels of the rectangle in which the right eye is located. The bounding box data is stored to the movie file 207. The data contained within the bounding box is then run length encoded 208 and saved in the movie file 209. The movie building program works through the frameset and stores the differences between adjacent sequential images, in the form of difference data, to the movie file 209. The difference data being an array of bytes that represents the RLE compressed description of the pixels in bounding box. The process may be further optimised by having the movie building software recognise and store to the movie file a second bounding box. This second bounding box identifies 210 the non-transparent portion of the completed frame. This allows playback to be accelerated as the playback software can detect which area of the screen will be changed by the particular frame of the movie being rendered.

As shown in FIG. 3, a person wishing to view the movie uses image display software which interprets the movie file. The playback software first loads the RLE data for all frames into memory 301 then decodes the first frame 303 to a non-compressed array 302. This array is used to produce the initial image 11 which is displayed on the screen 304. It then decompresses 305 and maps the RLE data for the second frame 306 onto the non-compressed array and produces 307 the second image 12 to be displayed. This process is performed in real time and repeated for each subsequent frame in the frame set. In this example, the entire process is repeated twice to produce the movie "Winking" or 11, 12, 11, 12.

An additional advantage of using RLE compression is that one can decompress and map the pixels of the difference frame concurrently without needing to create an intermediate non-compressed array for the difference data.

We claim:

1. A method of creating a binary animation file comprising the steps of:

selecting an initial image and subsequent images having pixels;

converting a colour pallet of the initial image having n indexes to a colour pallet having n−1 indexes so that one of the n indexes is used as a mask index;

determining, in addition to the initial image, a second and subsequent images which will be contained in the file and defining a frameset which begins with the initial image and defines a sequence of images;

compressing the initial image using Run Length Encoding and storing it to a movie file;

creating, using the mask index, a new data array for the second image and subsequent images;

comparing a second image to the initial image on a pixel by pixel basis;

storing differences between the first and second images in the form of difference data to the movie file, the difference data comprising an array of bytes that represent a Run Length Encoded compressed description.

2. The method of claim 1, further comprising the steps of:

for the second or a subsequent images in the frameset, determining a bounding box in which pixels have changed from the previous image, this change being bounding box data;

defining the bounding box as having a location and storing the bounding box location to the movie file;

encoding the bounding box data using Run Length Encoding; storing the encoded bounding box data to the movie file.

3. The method of claim 1, further comprising the step:

storing to the movie file, for one or more frames in the frameset, a seconding bounding, the second bounding box identifying a non-transparent portion of a completed frame.

4. A method of displaying, on a computer having a screen, an animation stored to a file of the type created by claim 1, comprising the steps of:

utilizing image display software on a computer to interpret the movie file, loading the Run Length Encoded data for all frames into the memory of the computer;

decoding the first frame to a non-compressed array;

using the array to produce an initial image on the screen;

decompressing and mapping the Run Length Encoded data for the second and subsequent frames, in real time, on to the non-compressed array and producing a second and subsequent images on the screen.

5. A method of creating a binary animation file comprising the steps of: selecting an initial image and subsequent images having pixels;

converting a colour pallet of the initial image having n indexes to a colour pallet having n−1 indexes so that one of the n indexes is used as a mask index;

determining, in addition to the initial image, a second and subsequent images which will be contained in the file and defining a frameset which begins with the initial image and defines a sequence of images;

compressing the initial image using Run Length Encoding and storing it to a movie file;

creating, using the mask index, a new data array for the second image and subsequent images;

comparing a subsequent image to an initial image on a pixel by pixel basis to determine a difference, and using the mask index to store only the difference between these images, the difference data comprising an array of bytes that is Run Length Encoded.

6. The method of claim 5, further comprising the steps of:

for the second or a subsequent image in the frameset, determining a bounding box in which pixels have changed from the previous image, this change being bounding box data;

defining the bounding box as having a location and storing the bounding box location to the movie file;

encoding the bounding box data using Run Length Encoding; storing the encoded bounding box data to the movie file.

7. The method of claim 5, further comprising the step of:

storing to the movie file, for one or more frames in the frameset, a seconding bounding, the second bounding box identifying a non-transparent portion of a completed frame.

8. A method of displaying, on a computer having a screen, an animation stored to a file of the type created by claim 5, comprising the steps of: utilizing image display software on a computer to interpret the movie file, loading the Run Length Encoded data for all frames into the memory of the computer;

decoding the first frame to a non-compressed array;

using the array to produce an initial image on the screen;

decompressing and mapping the Run Length Encoded data for the second and subsequent frames, in real time, on to the non-compressed array and producing a second and subsequent images on the screen.

* * * * *